United States Patent
Liu et al.

(10) Patent No.: US 8,405,948 B2
(45) Date of Patent: Mar. 26, 2013

(54) EMI NOISE SHIELDING DEVICE

(75) Inventors: Ta-I Liu, Taipei (TW); Chung-Chih Tung, Taipei (TW)

(73) Assignee: Ta-I Liu, Taipei (TW)

(*) Notice: Subject to any disclaimer, the term of this patent is extended or adjusted under 35 U.S.C. 154(b) by 451 days.

(21) Appl. No.: 12/704,228

(22) Filed: Feb. 11, 2010

(65) Prior Publication Data

US 2011/0194215 A1    Aug. 11, 2011

(51) Int. Cl.
H02H 3/22    (2006.01)

(52) U.S. Cl. ....................................................... 361/111

(58) Field of Classification Search .................. 361/111, 361/159, 818; 318/400.24
See application file for complete search history.

(56) References Cited

U.S. PATENT DOCUMENTS

| | | | |
|---|---|---|---|
| 5,309,309 A * | 5/1994 | Weber | 361/18 |
| 5,565,761 A * | 10/1996 | Hwang | 323/222 |
| 7,480,124 B2 * | 1/2009 | Pankau et al. | 361/85 |
| 7,622,845 B2 * | 11/2009 | Micko | 310/316.01 |
| 8,040,117 B2 * | 10/2011 | Telefus | 323/271 |
| 2005/0134374 A1 * | 6/2005 | Hench et al. | 330/86 |
| 2006/0093017 A1 * | 5/2006 | Gong et al. | 375/134 |
| 2009/0115462 A9 * | 5/2009 | Redoute et al. | 327/108 |
| 2012/0078139 A1 * | 3/2012 | Aldridge et al. | 601/2 |

* cited by examiner

*Primary Examiner* — Rexford Barnie
*Assistant Examiner* — Christopher Clark
(74) *Attorney, Agent, or Firm* — Chun-Ming Shih

(57) ABSTRACT

An EMI noise shielding device applied to a power supply control system includes a first resistor with a terminal electrically coupled to a terminal of a second resistor to form an input terminal, a differential amplifier for receiving a feedback voltage (Vfb) signal containing a noise from the input terminal to perform a first filter process to generate a first node voltage (VA) signal, a signal converter for receiving the first node voltage (VA) signal to perform an analog-to-digital signal conversion process and a second filter process to generate a second node voltage (VB) signal, and a digital control circuit for receiving the second node voltage (VB) signal to perform a determination process and a third filter process to generate a third node voltage (VC) signal. Therefore, the noise signal contained in the feedback voltage (Vfb) signal can be filtered to maintain the normal operation of the power supply control system.

7 Claims, 2 Drawing Sheets

EMI NOISE SHIELDING DEVICE

BACKGROUND OF THE INVENTION

1. Field of the Invention

The present invention relates to an electromagnetic interference (EMI) noise shielding device, and more particularly to an EMI noise shielding device capable of filtering a noise in a feedback voltage (Vfb).

2. Description of Related Art

In general, a conventional digital power supply control device outputs and supply an electric power with appropriate current and voltage values to an electric appliance in order to achieve the effects of protecting related circuits, improving the lifespan of the electric appliance, and saving electric power.

However, if a digital power width modulation (PWM) output unit of the conventional digital power supply control device receives a plurality of sample control signals outputted by a duty cycle modulation control unit, a power switching unit will modulate and output an appropriate steady-state voltage for the operation of an electric appliance according to the sample control signals. Before the sample control signals are outputted, signals containing noises are generally amplified by an amplification circuit. If the digital PWM output unit modulates a duty cycle of an analog pulse train outputted from the power switching unit, or there may be a modulation, the power switching unit may be interfered by the signals transmitted from the digital PWM output unit, so that a high signal among the signals may be mistaken as a low signal, or the low signal among the signals may be mistaken as a high signal. As a result, the precision of the modulated duty cycle of the analog pulse train outputted by the power switching unit is lowered, and the voltage outputted by the power switching unit may not be a steady-state voltage as required, and the electric appliance cannot operate normally.

Therefore, finding a way of filtering the noise signals in the sample control signals and avoiding possible misjudgments made by the power switching unit during the modulation process demands immediate attentions and feasible solutions.

SUMMARY OF THE INVENTION

Therefore, it is a primary objective of the present invention to provide an EMI noise shielding device applied to a power supply control system, and the EMI noise shielding device comprises: a first resistor, having a terminal electrically coupled to a terminal of a second resistor to form an input terminal; a differential amplifier, for receiving a feedback voltage (Vfb) signal containing a noise from the input terminal to perform a first filter process, so as to generate a first node voltage (VA) signal; a signal converter, for receiving the first node voltage (VA) signal to perform an analog-to-digital signal conversion process and a second filter process, so as to generate a second node voltage (VB) signal; and a digital control circuit, for receiving the second node voltage (VB) signal to perform a determination process and a third filter process, so as to generate a third node voltage (VC) signal. Therefore, the EMI noise shielding device can filter and eliminate the noise signal contained in the feedback voltage (Vfb) signal to maintain a normal operation of the power supply control system.

To achieve the foregoing objectives, the present invention provides an EMI noise shielding device comprising: a first resistor; a second resistor, electrically coupled to a terminal of the first resistor to form an input terminal, for receiving a feedback voltage signal containing a noise; a differential amplifier, having an input pin for receiving the feedback voltage signal to perform a first filter process and generate a first node voltage signal; a signal converter having an input pin for receiving the first node voltage signal to perform an analog-to-digital signal conversion process and a second filter process to generate a second node voltage signal; and a digital control circuit, having an input pin for receiving the second node voltage signal to perform a determination process and a third filter process to generate a third node voltage signal.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
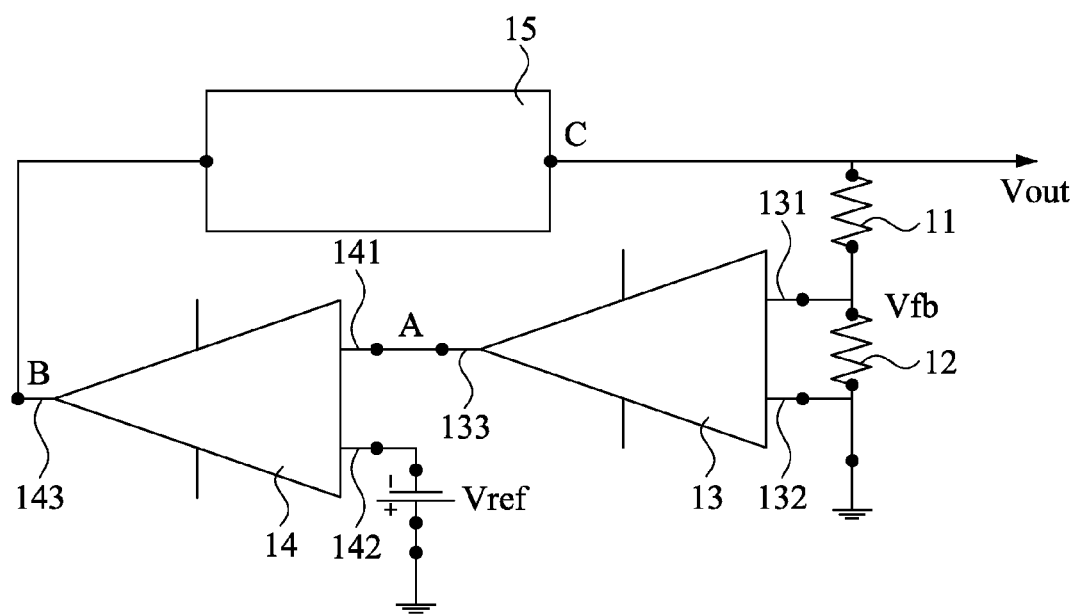
FIG. 1 is a schematic circuit diagram of an EMI noise shielding device of the present invention.

With reference to FIG. 1 for a schematic circuit diagram of an EMI noise shielding device of the present invention, the EMI noise shielding device is applied to a power supply control system and comprises a first resistor 11, a second resistor 12, a differential amplifier 13, a signal converter 14 and a digital control circuit 15, wherein a terminal of the first resistor 11 is electrically coupled to a terminal of the second resistor 12 to form an input terminal, which is provided for receiving a feedback voltage (Vfb) signal containing a noise.

An input pin 131 of the differential amplifier 13 is provided for receiving the feedback voltage (Vfb) signal containing the noise, and another input pin 132 of the differential amplifier 13 is electrically coupled to another terminal of the second resistor 12 for performing a first filter process to generate a first node voltage (VA) signal.

An input pin 141 of the signal converter 14 is provided for receiving the first node voltage (VA) signal VA, and another input pin 142 of the signal converter 14 is provided for receiving a low-level voltage reference Vref- to perform an analog-to-digital signal conversion process and a second filter process, so as to generate a second node voltage (VB) signal.

An input pin 151 of the digital control circuit 15 is provided for receiving the second node (VB) voltage signal to perform a determination process and a third filter process, so as to generate a third node (VC) voltage signal.

Figure 2:
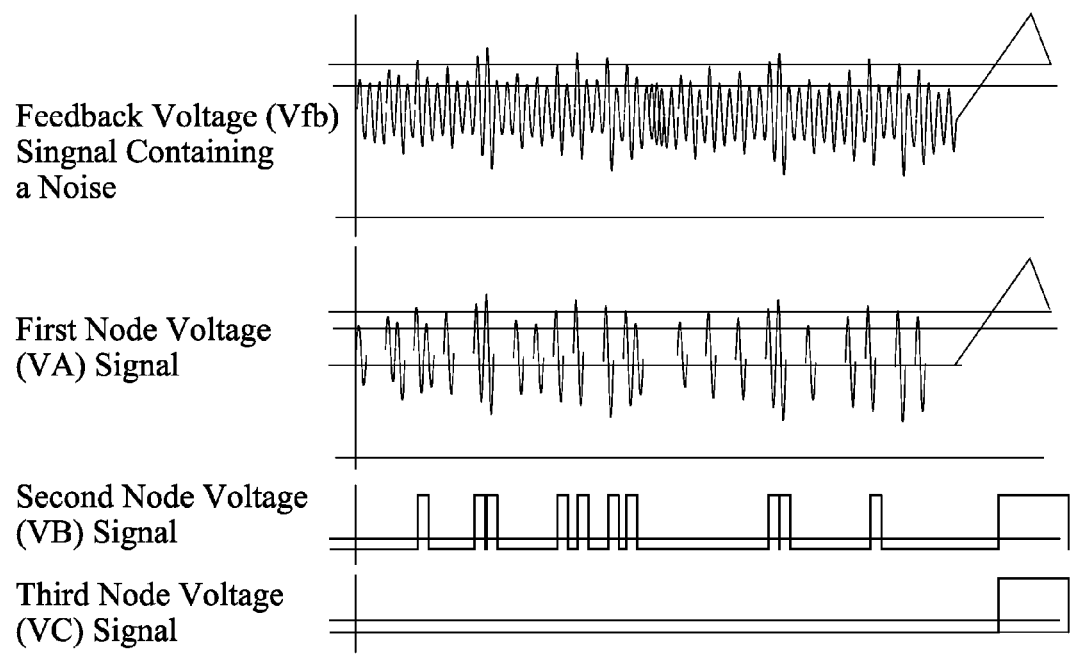
FIG. 2 is a waveform chart of an EMI noise shielding device of the present invention, showing the waveforms before and after filtering the noises.

With reference to FIG. 2 for a waveform chart of an EMI noise shielding device of the present invention showing the waveforms before and after filtering the noises, the first waveform shows a voltage waveform of a feedback voltage (Vfb) signal containing a noise; the second waveform shows a voltage waveform of a feedback voltage (Vfb) signal containing a noise, which is received by the input pin 131 of the differential amplifier 13 and processed in the first filter process, and the generated first node voltage (VA) signal is outputted to a first node A; the third waveform shows a voltage waveform of a second node voltage (VB) signal, wherein the first node voltage (VA) signal is received from the first node A through the input pin 141 of the signal converter 14, and after the analog-to-digital signal conversion process and the two filter processes take place, and the generated voltage waveform is outputted to a second node B, and the fourth waveform shows a voltage waveform of a third node voltage (VC) signal, wherein the second node voltage (VB) signal is received by the input pin 151 of the digital control circuit 15 from the second node B, and after the determination process and the third filter process takes place, and the third node voltage (VC) signal is outputted to a third node C.

The differential amplifier 13 filters a small noise signal in the received feedback voltage (Vfb) signal during the first filter process to generate the first node voltage (VA) signal first, and then the signal converter 14 performs the analog-to-digital signal conversion process to convert the first node voltage (VA) signal. If any analog signal cannot be converted into a digital signal (which contains 0 and 1) during the analog-to-digital signal conversion process, then the second filter process will be performed to filter the analog signal that cannot be converted into a digital signal, and a low-level voltage signal is also filtered according to the low-level voltage reference Vref- to generate the second node voltage (VB) signal, and finally the digital control circuit 15 determines whether or not the width of the waveform of the second node voltage (VB) signal complies with the required width. If the width of the waveform of the second node voltage (VB) signal does not comply with the required width, then the waveform having an insufficient width will be considered as a noise, and the noise will be filtered by the third filter process, so that the signal having a waveform in compliance with the required width can be passed through the digital control circuit 15, and finally the third node voltage (VC) signal is generated.

In summation of the description above, the EMI noise shielding device of the present invention performs the first filter process, the analog-to-digital signal conversion process, the second filter process, the determination process and the third filter process to a small a noise signal in the feedback voltage (Vfb) signal by the differential amplifier 13, the signal converter 14 and the digital control circuit 15 to filter the noise signal in the feedback voltage (Vfb) signal, so as to achieve the effect of maintaining the normal operation of the power supply control system.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An electromagnetic interference (EMI) noise shielding device, applied to a digital power supply control system, and comprising:

a first resistor having a first terminal and a second terminal;

a second resistor, having a first terminal electrically coupled to a second terminal of the first resistor to form an input terminal, for receiving a feedback voltage signal containing a noise;

a differential amplifier, having a first input in electrically coupled to the first terminal of the second resistor and the second terminal of the first resistor, and a second input pin electrically coupled to the second terminal of the second resistor and then electrically coupled to a ground, for receiving the feedback voltage signal containing the noise to perform a first filter process, so as to generate a first node voltage signal;

a signal converter, having a first input pin electrically coupled to the differential amplifier for receiving the first node voltage signal to perform an analog-to-digital signal conversion process and a second filter process, so as to generate a second node voltage signal; and a digital control circuit, having an input pin electrically coupled to the signal converter and an output in electrically coupled to the first terminal of the first resistor, for receiving the second node voltage signal to perform a determination process and a third filter process, so as to generate a third node voltage signal for output.

2. The EMI noise shielding device of claim 1, wherein the differential amplifier outputs the first node voltage signal to a first node.

3. The EMI noise shielding device of claim 2, wherein the first input pin of the signal converter receives the first node voltage signal from the first node.

4. The EMI noise shielding device of claim 1, wherein a second input pin of the signal converter receives a low level voltage reference.

5. The EMI noise shielding device of claim 1, wherein the signal converter outputs the second node voltage signal to a second node.

6. The EMI noise shielding device of claim 5, wherein the input pin of the digital control circuit receives the second node voltage signal from the second node.

7. The EMI noise shielding device of claim 1, wherein the digital control circuit outputs the third node voltage signal to a third node.

* * * * *